United States Patent
Mauer et al.

[11] Patent Number: 5,834,728
[45] Date of Patent: Nov. 10, 1998

[54] PROCESS AND DEVICE FOR THE APPLICATION OF COMPONENTS WHICH ARE STRUNG TOGETHER IN THE MANNER OF A BELT ONTO WORKPIECES

[75] Inventors: Dieter Mauer, Lollar; Hermann Roser, Wermelskirchen, both of Germany

[73] Assignee: Emhart, Inc., Newark, Del.

[21] Appl. No.: 591,254

[22] Filed: Jan. 19, 1996

[30] Foreign Application Priority Data

Jan. 25, 1995 [DE] Germany ............... 195 02 262.9

[51] Int. Cl.⁶ ...................................... B23K 9/20
[52] U.S. Cl. ............................. 219/99; 219/98
[58] Field of Search .............. 219/99, 98, 56.1, 219/56.21, 56.22

[56] References Cited

U.S. PATENT DOCUMENTS

| | | | |
|---|---|---|---|
| 3,312,810 | 4/1967 | Neumeir | 219/98 |
| 4,438,314 | 3/1984 | Giannone | 219/98 |
| 4,501,063 | 2/1985 | McNeely . | |

FOREIGN PATENT DOCUMENTS

| | | |
|---|---|---|
| 0537926 | 4/1993 | European Pat. Off. . |
| 2737602 | 3/1979 | Germany . |
| 59-214525 | 4/1984 | Japan . |

OTHER PUBLICATIONS

IBM Technical Disclosure Bulletin, vol. 31, No. 7, Dec. 1988, Armonk USA, pp. 122–124, XP000035719 "Airfeed Parts Presentation Device For Robotic Assembly Station".

*Primary Examiner*—Clifford C. Shaw
*Attorney, Agent, or Firm*—Edward D. Murphy

[57] ABSTRACT

The invention relates to a process for the application of components strung together in the manner of a belt onto workpieces in which the components are intermittently brought successively into a separating position for a respective component. The component halted in the separating position is initially grasped by a spatially movable jointing tool brought to the separating position over a free path, the jointing tool being held in its position defined by the halted component, the grasped component then severed from the subsequent component and is finally transferred by the jointing tool into the respectively desired jointing position remote from the separating position, in which the component is fastened on the workpiece, for example by electric arc welding.

7 Claims, 7 Drawing Sheets

PROCESS AND DEVICE FOR THE APPLICATION OF COMPONENTS WHICH ARE STRUNG TOGETHER IN THE MANNER OF A BELT ONTO WORKPIECES

The present invention relates to a process for the application of components strung together in the manner of a belt onto workpieces, in which the components are brought intermittently in succession into a separating position. The invention also relates to a device for carrying out this process.

A device for the application of spring nuts onto pegs of a workpiece is known from DE-OS 27 37 602, in which the spring nuts which are strung together in the manner of a belt are pushed intermittently through a supply duct in front of a device with which the last respective spring nut is severed from the preceding spring nuts and is pushed onto the respective bolt by a thrust operation, on which the device had previously been placed with the initially not yet severed spring nut. As pressure is applied, the spring nut initially held by the peg is severed from the following spring nut and thereby pushed completely onto the peg and therefore mounted thereon. The tool used for supplying the individual spring nuts and for severing them from the belt is therefore placed at the respective application point, the jointing position, in which the above-described operations then take place.

It is an object of the present invention to provide a process and a device which allow the last respective component to be conveyed reliably into the jointing position after it has been severed from the string. The present invention provides a process for the application of components strung together in the manner of a belt onto workpieces, in which the components are brought intermittently in succession into a separating position for a particular component, characterised in that the component halted in the separating position is initially grasped by a spatially movable jointing tool brought to the separating position via a free path, the jointing tool being held in its position defined by the halted component, the grasped component is then severed from the following component and is finally brought by the jointing tool into the desired jointing position which is remote from the separating position and in which the component is fastened onto the workpiece, for example by electric arc welding.

The present invention further provides a device for carrying out the process according to the invention, characterised in that, for supplying the components which are strung together in the manner of a belt a supply duct is provided which extends to a separating blade determining the separating position and, after the separating blade, passes into a receiving duct for the jointing tool which serves to receive the jointing tool and to support it in front of the separating position when the component is grasped.

In the process according to the invention, the separating position in which the last component of the string is halted is utilised to give the jointing tool brought to the separating position a defined situation because when the component is grasped by the jointing tool, the component is still held by the following string from which the component has not yet been severed during this grasping operation. For the transfer of the last component into the jointing tool, there are therefore defined positions for both the component and the jointing tool, which ensure precise location of the component for the separating operation. At the same time, precise location of the component in the jointing tool grasping it is also obtained so, after the subsequent transfer of the component to the desired jointing position, the jointing tool itself is capable of being orientated to the jointing position and therefore of positioning the component.

For carrying out the above-described process, the device is preferably designed in such a way that for supplying the components which are strung together in the manner of a belt a supply duct is provided which extends to a separating blade determining the separating position and, after the separating blade, passes into a receiving duct for the jointing tool which serves to receive the jointing tool and to support it in front of the separating position when the component is grasped.

Combination of the supply duct and the receiving duct produces a design in which the components which are strung together in the manner of a belt can be received via the separating position directly in the jointing tool which can rest in the receiving duct, guaranteeing exact transfer of the individual components including the severing thereof, in a desirable manner.

An advance arrangement for the intermittent displacement and halting of the components is advantageously provided in the supply duct. The device is also preferably designed in such a way that the separating blade which is movable transversely to the supply duct between a basic location, a cutting location and a correcting location is coupled to a correcting member for the penultimate component, the separating blade clearing the way for displacement of the components in the basic location, the last component being severed in the cutting location and the situation of the penultimate component and therefore of the string optionally being corrected in the correcting location. The displacement of the components can therefore take place in the basic location without obstruction by the separating blade, the last respective component passing into the region of the receiving duct where it is halted by the advance arrangement and is therefore ready to be grasped by the jointing tool.

The jointing tool is preferably provided with a clamping arrangement for a component which ensures that a component is also held reliably by the jointing tool when the component is grasped.

In order to alternate the operations involved in the advance of the components, the severing thereof and grasping thereof by this jointing tool, the receiving duct can be provided with a sensor which, on introduction of the jointing tool into the receiving duct and attainment of the grasping position, triggers a sequence control system by means of which the grasping of the components by the jointing tool, the severing of the last component and the removal of the components with the jointing tool from the receiving duct and the next supply stage are triggered in succession.

The remaining operations are made dependent on the introduction of the jointing tool into the receiving duct and the attainment of the grasping position, by means of the sensor, these operations being controlled by a sequence control system which is triggered by the sensor and successively brings about the grasping of the components by the jointing tool, the severing of the last component and removal of the components by the jointing tool from the receiving duct so the next supply stage for supplying the next component can finally be triggered. The introduction of the jointing tool which grasps a component already in the receiving duct is therefore the impetus for the sequence of other operations so in this way the jointing tool, with which a respective component is transferred into the jointing position, can successively process component by component in the described manner, the jointing tool with the grasped component being guided to the jointing position where the component is fastened on a workpiece and then being moved in front of the receiving duct again in order to grasp a component available therein and to continue processing it as described hereinbefore.

An embodiment of the invention is illustrated in the drawings, in which.

Figure 1:
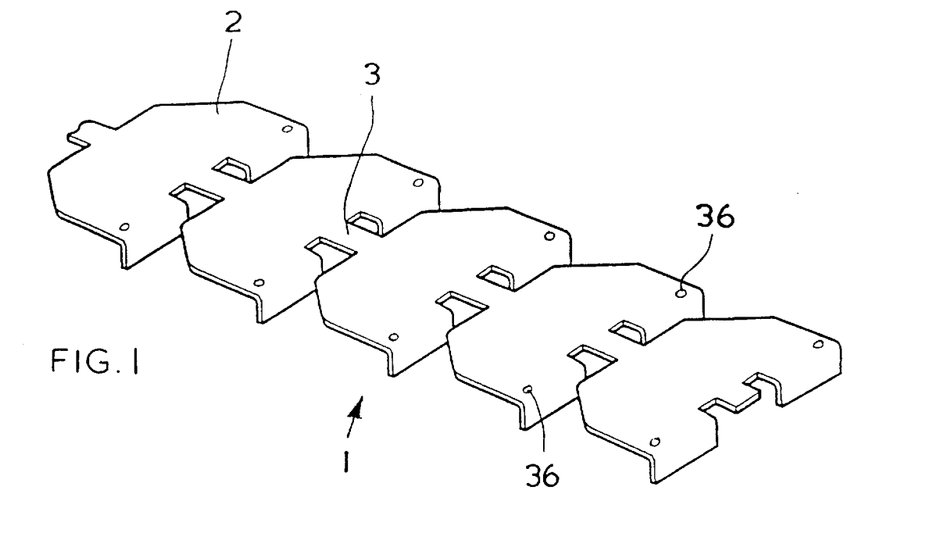
FIG. 1 shows a string of components which are directly connected to one another in the manner of a belt.

FIG. 1 shows components 2 which are strung together in the manner of a belt and, in their string, form the belt 1. The components 2 are strung together here by means of the webs 3 directly connecting the individual components. The components 2 are formed by pieces of shaped sheet metal, during whose shaping the respective web 3 connecting two adjacent components 2 remains, in other words the webs 3 are obtained from the sheet metal strips forming the basis of the shaping of the sheet metal members 2 so the belt 1 has a longitudinally stable configuration. The connection of the components 2 by the webs 3 obviously represents only one embodiment and any other belt-like connection of the individual components is also possible. The illustrated components 2 also represent only one embodiment. For example, plastics parts connected in the manner of a belt by cords can similarly be used for the components according to FIG. 1.

Figure 2:
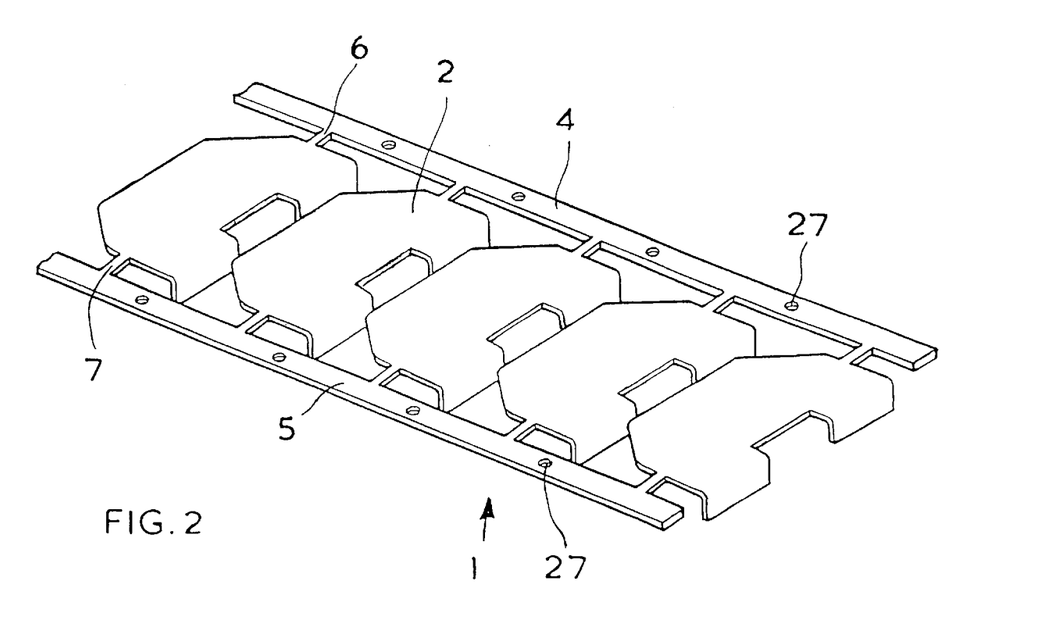
FIG. 2 shows a string of the same components which are connected to one another in the manner of a belt by means of adjacent webs.

FIG. 2 shows a belt 1 with a string of identical components 2, as shown in FIG. 1, but in which the components 2 are strung together via the two lateral strips 4 and 5 to which the components 2 are connected via the two respective bridges 6 and 7.

Figure 3:
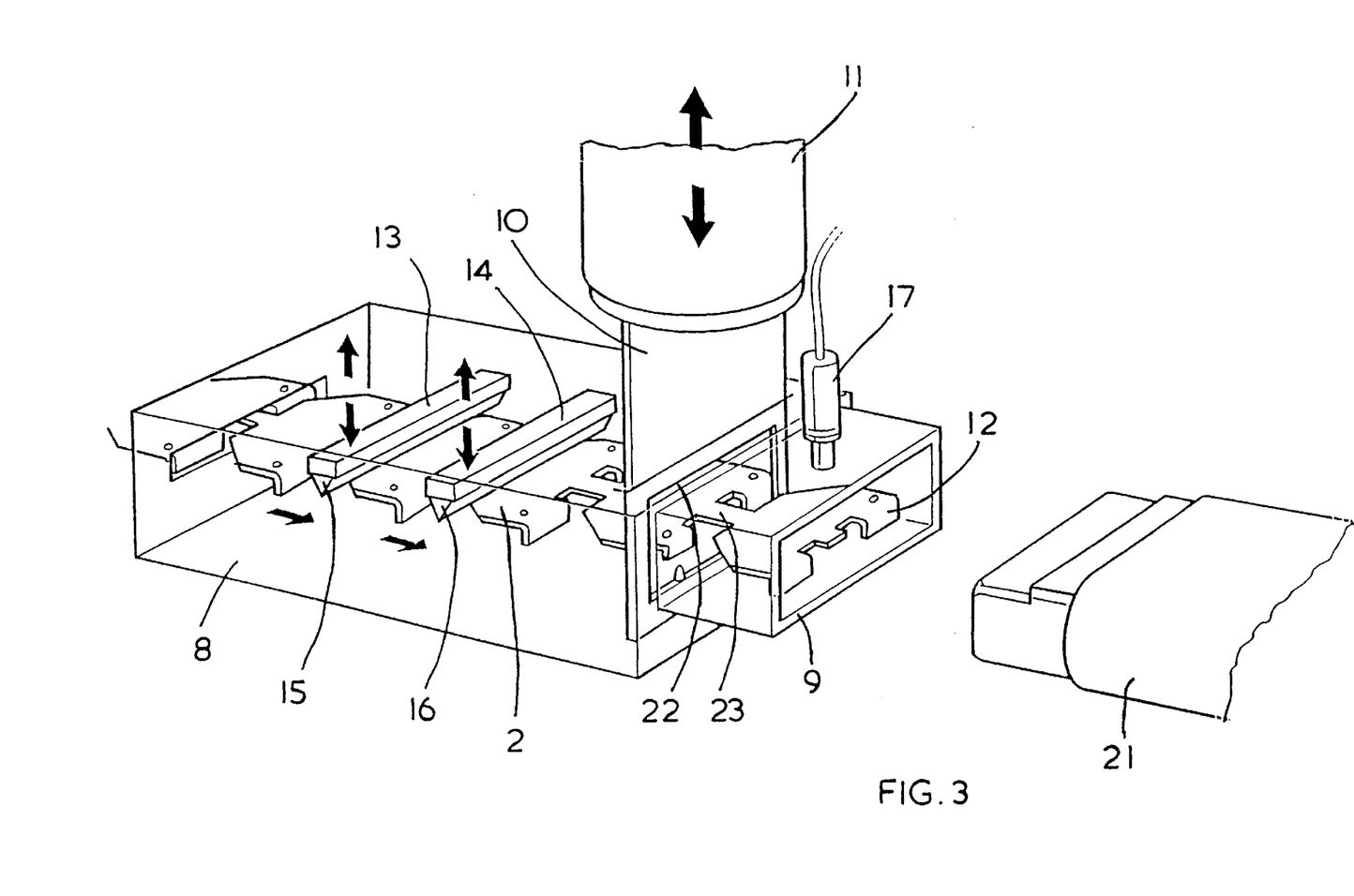
FIG. 3 shows the device with the separating blade in the basic location, a component located in the receiving duct and the jointing tool initially still held at a distance from it.

FIG. 3 shows the device for the supply, severing and grasping of the individual components 2 which are strung together in the arrangement according to FIG. 1. The device comprises the supply duct 8, the receiving duct 9 arranged laterally thereon and the jointing tool 21 available in front of the receiving duct 9. The supply duct and the receiving duct 9 are drawn as transparent squares in order to show the parts arranged in the interior, in particular the strung together components. The separating blade 10 which is moved up and down by lifting mechanism 11 penetrates into the supply duct 8 just before the receiving duct 9. The front respective component, the component 12 here, is severed from the components 2 behind it with the downward movement of the separating blade.

The supply duct 8 serves for the rhythmic advance of the components 2 in the sense of a supply to the receiving duct 9. The two push members 13 and 14 are provided for this advance and can be moved up and down in the direction of the indicated vertical arrows in order either to be moved away from the components 2 or to be pressed onto them. The push member 13 can also be moved to and fro in the direction of the arrows indicated in the longitudinal direction of the supply duct 8 toward the receiving duct 9. For the advance of the components 2, the push member 13 is pressed onto a component 2 while the push member 14 is held in a situation lifted from the components 2 so the components 2 located in the supply duct 8 are advanced toward the receiving duct 9 during a horizontal displacement of the push member 13 toward the receiving duct 9. The push member 14 is then lowered until it presses against the respective component 2 and therefore holds the belt containing the components 2 in the respectively attained situation. The push member 13 is then lifted from the respective component 2 and moved against the advance direction back into a starting position from which it can then be lowered toward a component 2 again in order to perform a new advance stage. The belt containing the components 2 is supported from below by an invisible carrier over which the components 2 can slide during the advance. Pressure is applied by the push members 13 and 14 and the components 2 are entrained by utilising the elastic properties of wedge-shaped projections 15 and 16 which can consist, for example, of rubber of a similar elastic material. The mechanism required for the up and down movement and the advance movement is omitted from FIG. 3 for the sake of clarity. It is a conventional advance mechanism of which the design has nothing to do with the invention dealt with here.

FIG. 3 shows the device in an operating state in which the component 12 projects completely into the receiving duct 9. This situation of the component 12 is detected by the sensor 17 of which the function is described in detail hereinafter in conjunction with FIG. 8. The component 12 is then grasped in the receiving duct 9 by insertion of the jointing tool 21, as described hereinafter with reference to FIG. 4.

Figure 4:
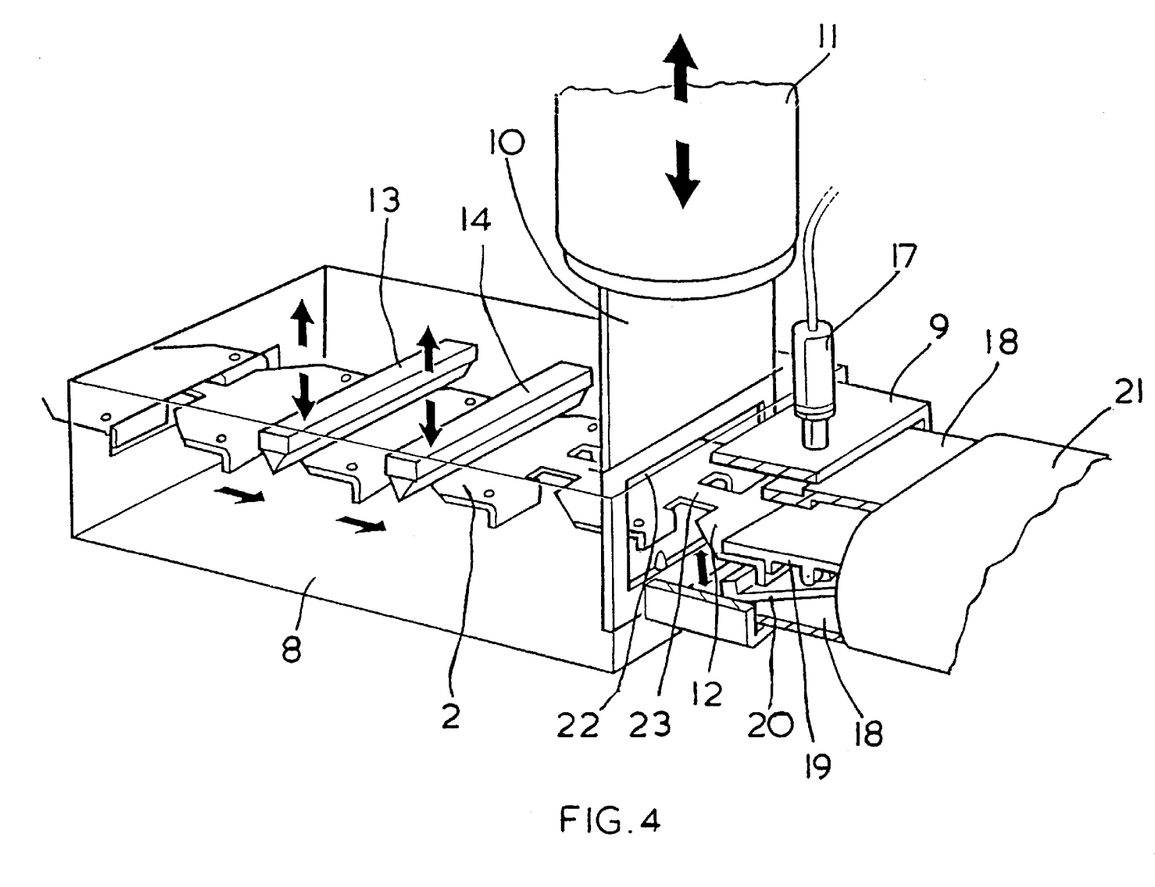
FIG. 4 shows the same arrangement with the jointing tool introduced into the receiving duct.

FIG. 4 shows the device according to FIG. 3 with the jointing tool 21 which is inserted into the receiving duct 9 and has a neck piece 18 penetrating into the receiving duct 9 and fitting therein. The neck piece 18 gives the jointing tool 21 in the receiving duct 9 a position aligned therewith. The neck piece 18 contains a clamping arrangement with the jaws 19 and 20 of which the jaw 20 as the lower jaw is arranged so as to pivot relative to the jaw 19. The clamping arrangement is shown in its open situation in FIG. 4 in which it can be pushed over the component 12 until the component 12 lies completely within the jaws 18 and 19. The component 12 is halted owing to the effect of the above-described push members 13 and 14 so the jointing tool 21 can be held on the component 12. The halting of the belt with the components 2 and 12 therefore also gives the jointing tool 21 a defined position within the receiving duct 9 in the position shown in FIG. 4.

Figure 5:
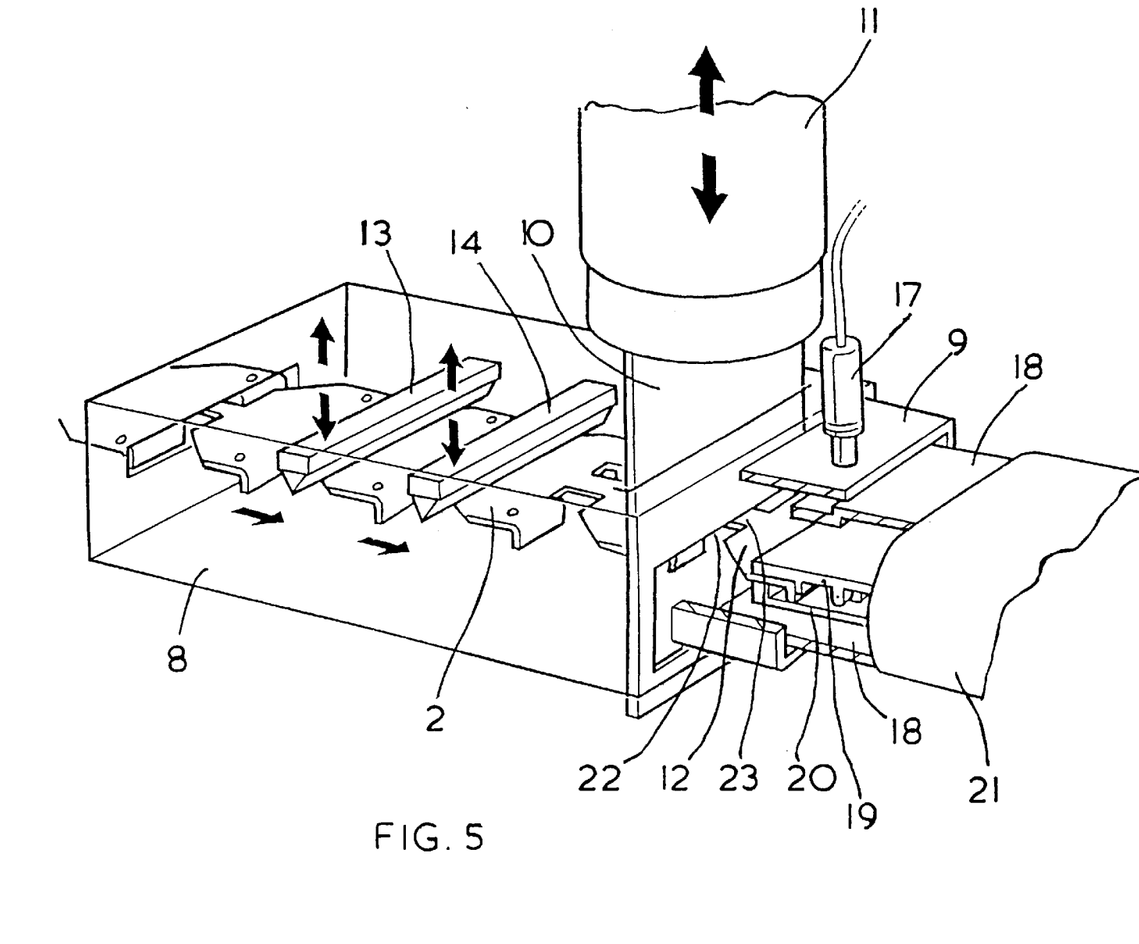
FIG. 5 shows the same arrangement with the component clamped by the jointing tool in the receiving duct.

In the jointing tool 21, the lower jaw 20 is pivoted onto the upper jaw 19, i.e. the clamping arrangement consisting of these two jaws is closed, as shown in FIG. 5. FIG. 5 shows the arrangement according to FIG. 4 but with closed jaws 19 and 20, i.e. with component 12 grasped and held by the jointing tool 21. The clamping of the component 12 by the jointing tool 21 and the halting of the belt with the components 2 by the push members 13 and 14 produce a defined position for all components in the situation of the device shown in FIG. 5 so the component 12 can now be severed from the subsequent components 2 by the separating blade 10.

In FIG. 5, the separating blade 10 is shown in a situation which is lower than the position according to FIGS. 3 and 4 in which it rests with its cutting edge 22 on the web 23 (which corresponds to the web 3 in FIG. 1). The web 23 is severed by a further short downward movement (not shown here) of the separating blade 10 into a cutting location so the component 12 can now be removed from the subsequent components.

Figure 8:
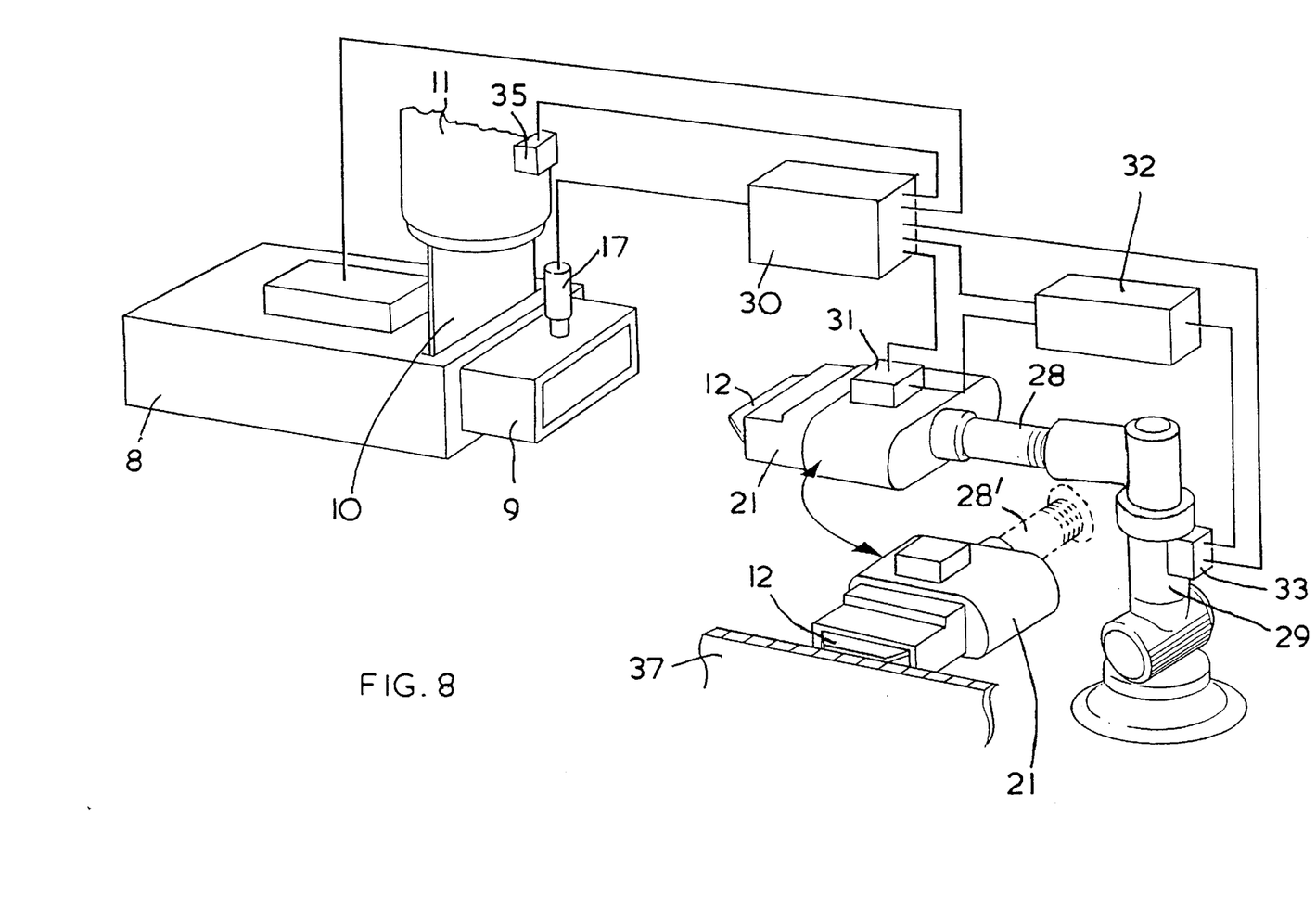
FIG. 8 is a diagram showing the cooperation between the device for supplying the components, which are held in the manner of a belt, with separating blade and receiving duct, with a sequence control system controlled by a sensor and a robot for moving the jointing tool between the receiving duct and a workpiece.

Using a sequence control system described in conjunction with FIG. 8, the jointing tool 21 is now removed from the receiving duct 9 and entrains the component 12 which is clamped by its jaws 19 and 20 and can now be fastened on a workpiece by the jointing tool 21 which is described in detail in conjunction with FIG. 8.

Figure 6:
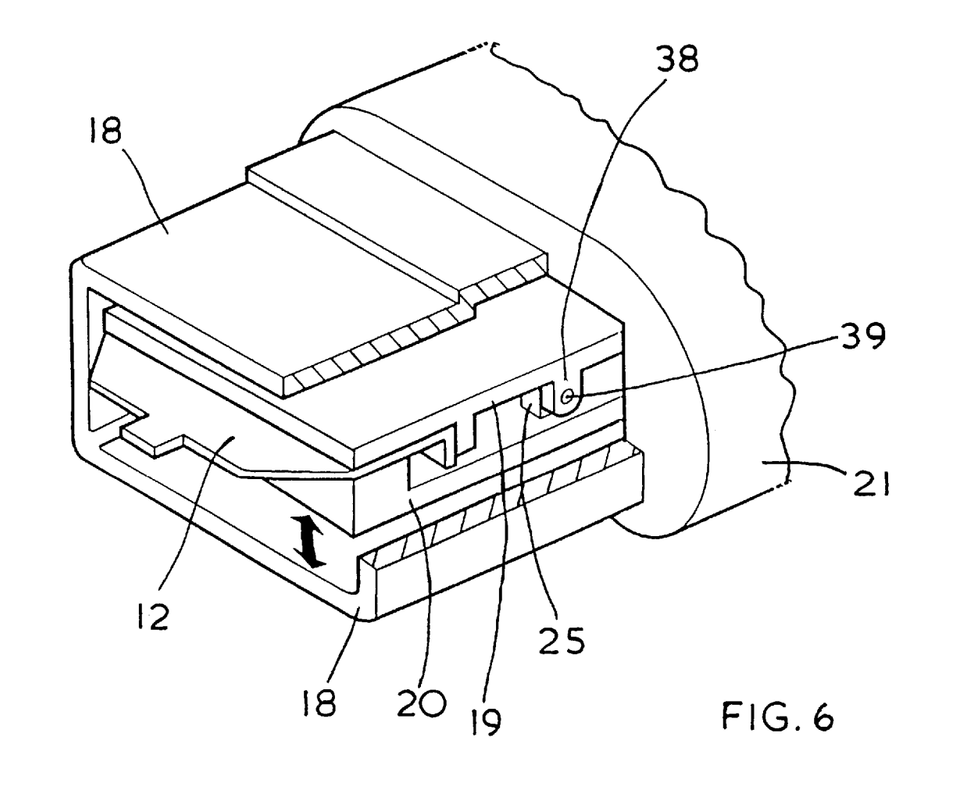
FIG. 6 shows the jointing tool removed from the receiving duct with a component clamped therein.

FIG. 6 shows the jointing tool 21 in a position remote from the receiving duct 9, more specifically with the component 12 clamped by the jaws 19 and 20. As shown in FIG. 6, the lower pivotal jaw 20 is mounted on the axis 39 which passes through the projection 38 on the jaw 19 and the bearing block 25 arranged on the jaw 20. As the lower jaw 20 pivots away from the upper jaw 19, the bearing block 25 rotates round the axis 39 causing the clamping arrangement consisting of the two jaws 19 and 20 to open and to pass into the situation shown in FIG. 4.

Figure 7:
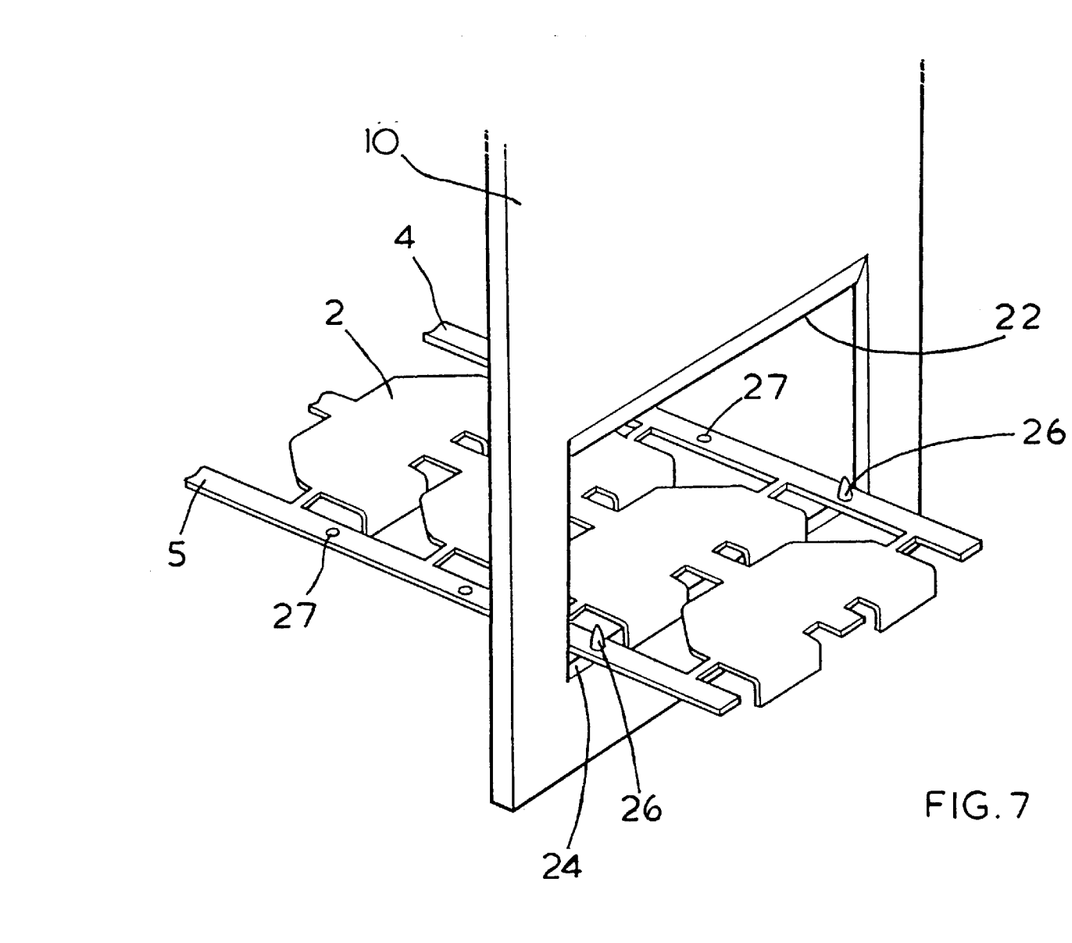
FIG. 7 shows the arrangement according to FIGS. 3 to 5 in the correcting location.

To correct possible inaccuracies during the advance of the components 2 which are strung together in the manner of a belt, the separating blade 10 is provided with a correcting member which consists of two correcting pins 26 arranged on the internal edge 24 opposite the cutting edge 22. In the position shown in FIG. 7, the conically designed correcting pins 26 engage in the correcting holes punched into the strips 4 and 5 shown in FIG. 2. Corresponding correcting holes 28 are also provided directly in the components 2 in the belt-like string according to FIG. 1. FIG. 7 shows the belt-like string of components 2 in the embodiment according to FIG. 2 in the correcting location in which the separating blade 10 is situated in its top situation. In this correcting location, the correcting pins 26 grasp the strips 4 and 5 and optionally correct their position and therefore that of the components 2 with respect to the situation of the separating blade 10 so the string of components 2 adopts the exact position for the severing of the front respective component during the subsequent downward movement of the separating blade 10 into the cutting location (location immediately after attainment of the position shown in FIG. 5).

In the embodiment selected for FIG. 7, the strips 4 and 5 are severed by the separating blade 10 so the bridges 6 and 7 with the parts of the strips 4 and 5 attached thereto are still to be severed from the respective component, if necessary, and this operation can also be carried out in any known manner.

When processing a belt according to FIG. 1, the correcting pins 26 on the separating blade 10 are obviously to be placed on the separating blade 10 in a position which is somewhat offset from that in FIG. 7 to enable the correcting holes 36 shown in FIG. 1 to be grasped correctly.

FIG. 8 shows the application of the component 12 grasped by the jointing tool 21 together with the associated sequence control system. According to FIG. 8, the jointing tool 21 adopts a situation remote from the receiving duct 9 (corresponding to the illustration in FIG. 6), for which purpose it is placed on a correspondingly axially movable arm 28 of a robot 29. The robot 29 then pivots its arm 28 into the jointing position shown in broken lines (arm 28'), in which the jointing tool 21 faces the workpiece 37 in such a way that the component 12 grasped and transported by the jointing tool can be fastened, for example welded, on the workpiece 37.

The sequence of movements of the robot 29 is controlled by the sequence control system 30 which receives a trigger signal from the above-mentioned sensor 17 when the jointing tool 21 is introduced into the receiving duct 9. The clamping control system 31 which causes the component (component 12 according to FIG. 5) halted in the receiving duct to be grasped is then activated via the sequence control system 30, whereupon the sequence control system 30 activates the robot control system 32 by means of which the robot drive 33 then produces the signal for removing the jointing tool 21 with the grasped component 12 from the receiving duct 9. The sequence control system 30 then continues to activate the robot control system 32 which controls the robot drive 33 in such a way that the robot arm 28 is pivoted into the situation which is designated by 28' and in which the component 12 is applied to the workpiece 37. Finally, in the above-described manner, the sequence control system via the robot control system 32 causes the robot arm 28 to move back into a position from which the jointing tool 21 can be pushed back into the receiving duct 9.

During these operations of moving the robot arm 28, the sequence control system 30 has actuated both the advance drive 34 and the separating blade drive 35, with the result that, during the above-described work of the robot 29 after removal of the component 12 from the receiving duct 9, the belt located in the interior of the supply duct is advanced until the next component adopts its situation within the receiving duct under the controlling influence of the sensor 17, the sequence control system controlling the blade drive 35 in such a way that the separating blade 10 is moved up and down between a basic location shown in FIG. 3, a cutting location (see FIG. 5) and a correcting location (see FIG. 7), the separating blade 10 clearing the way for displacement of the components 2 in the basic location and severing the component located in the receiving duct 9 in the cutting location (see FIG. 5). After the advance of the belt located in the supply duct 8, the separating blade 10 is lifted into the correcting location (see FIG. 7) in which it optionally corrects the situation of the component advanced into the receiving duct 9.

The operations are repeated cyclically under the influence of the sequence control system 30. The sequence control system is a conventional electronic control system of the type constantly used for controlling robots.

We claim:

1. A method for delivering components connected together in a continuous strip to a point of installation on a workpiece comprising the steps of delivering successive components to a separation position by repeatedly advancing said strip;

providing a moveable jointing tool for gripping successive components and for moving each successive component to an installation point, said jointing tool being freely moveable through said separation point;

moving said jointing tool towards said separation point so that it engages the next successive component on the strip, the movement of said jointing tool being stopped at said separation point by the connection of said next successive component to said strip;

separating the next successive component from the strip so that said jointing tool is immediately thereupon free to move said component to said installation point; and attaching said component to said workpiece.

2. Apparatus for rapidly delivering components successively separated from a continuous strip to a point of installation on a workpiece comprising a supply path for guiding the strip of components to present the leading component on the strip at a separation point;

a cutting device for successively separating said leading component from said strip;

a jointing tool freely moveable to and through said separation position, said tool including means for gripping said leading component, said tool being further moveable from said separation position to an installation position;

strip drive means for advancing successive leading components on said strip into said separation position; and means allowing said jointing tool to move to said separation position for engaging said leading component, said movement means allowing for the continued movement of said jointing tool to said installation position as soon as said leading component is severed from said strip.

3. A device for carrying out a process of applying components (2, 12) connected sequentially in an elongated belt onto workpieces, in which the components (2, 12) are brought intermittently in succession into a separating position for a respective component (2, 12), characterized in that the component (2, 12), halted in the separating position is initially grasped by a spatially movable jointing tool (21) brought to the separating position along a free path of motion extending from a start position through the separating position to a jointing position, the jointing tool (21) being held at the separating position by engagement with the halted component (12), the grasped component (12) is then severed from the subsequent component (2) and is finally brought by the jointing tool (21) into the respectively desired jointing position (28') which is remote from the separating position and in which the component (2) is fastened onto the workpiece (37) by welding, said device being characterized in that, for supplying the sequentially connected components (2) there is provided a supply duct (8) which extends to a separating blade (10) determining the separating position and, after the separating blade (10), passes into a receiving duct (9) for the jointing tool (21) which serves to receive the jointing tool (21) and to support it in front of the separating position when the component (2) is grasped.

4. Device according to claim 3, characterized in that an advance arrangement (13, 14) is provided in supply duct (8) for the intermittent displacement and halting of the components (2).

5. Device according to claim 3, characterized in that the jointing tool (21) is provided with a clamping arrangement (19, 20) for a component (2, 12).

6. Device according to claim 3, characterized in that the receiving duct (9) is provided with a sensor (17) which, on introduction of the jointing tool (21) into the receiving duct (9) and attainment of the grasping position, triggers a sequence control system (30) by means of which the grasping of the components (2, 12) by the jointing tool (21), the severing of the last component (12) and the removal of the components (12) with the jointing tool (21) from the receiving duct (9) and the next supply stage are triggered in succession.

7. A device for carrying out a process of applying components (2, 12) connected sequentially in a elongated belt onto workpieces, in which the component (2, 12) are brought intermittently in succession into a separating position for a respective component (2, 12), characterized in that the component (2, 12) halted in the separating position is initially grasped by a spatially movable jointing tool (21) brought to the separating position along a free path of motion extending from a start position through the separating position to a jointing position, the jointing tool (21) being held at the separating position by engagement with the halted component (12), the grasped component (12) is then severed from the subsequent component (2) and is finally brought by the jointing tool (21) into the respectively desired jointing position (28') which is remote from the separating position and in which the component (2) is fastened onto the workpiece (37) by welding, said device being characterized in that a separating blade (10) which is movable transversely to the supply duct (8) between a basic location, a cutting location and a correcting location is coupled to a correcting member (26) for the penultimate respective component (2), the separating blade (10) clearing the way for displacement of the components (2) in the basic location, the last respective component (12) being severed in the cutting location and the situation of the penultimate component (2) and therefore of the string optionally being corrected in the correcting location.

* * * * *